Feb. 27, 1945.  L. A. WILKIE  2,370,508
AMPHIBIOUS VEHICLE
Filed Sept. 15, 1941  5 Sheets-Sheet 2

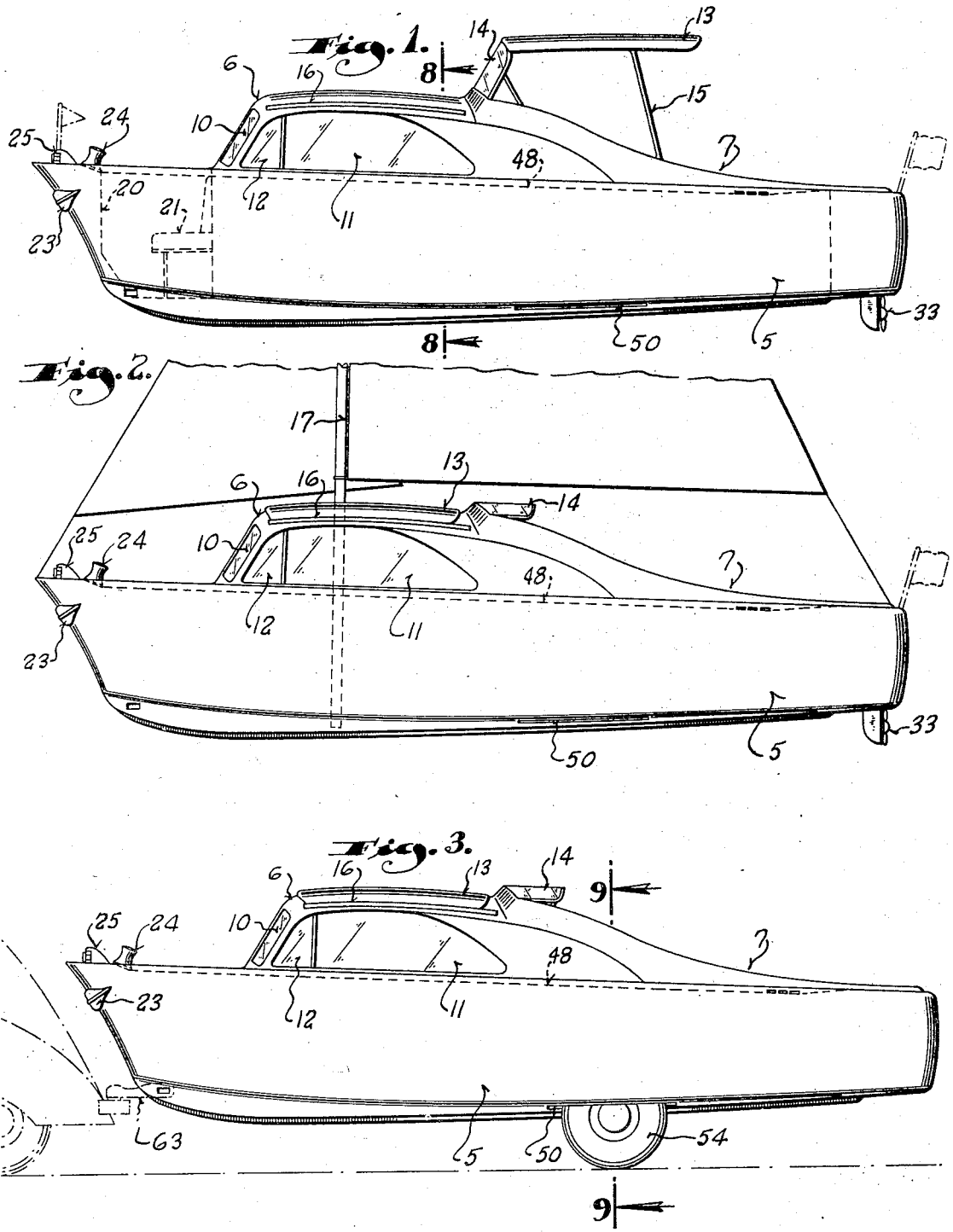

Inventor
Leighton A. Wilkie
By [signature]
Attorney

Feb. 27, 1945. L. A. WILKIE 2,370,508
AMPHIBIOUS VEHICLE
Filed Sept. 15, 1941 5 Sheets-Sheet 3

Inventor
Leighton A. Wilkie

Feb. 27, 1945.   L. A. WILKIE   2,370,508
AMPHIBIOUS VEHICLE
Filed Sept. 15, 1941   5 Sheets-Sheet 4

Inventor
Leighton A. Wilkie
By Hamilton Jones
Attorney

Feb. 27, 1945. L. A. WILKIE 2,370,508
AMPHIBIOUS VEHICLE
Filed Sept. 15, 1941 5 Sheets-Sheet 5
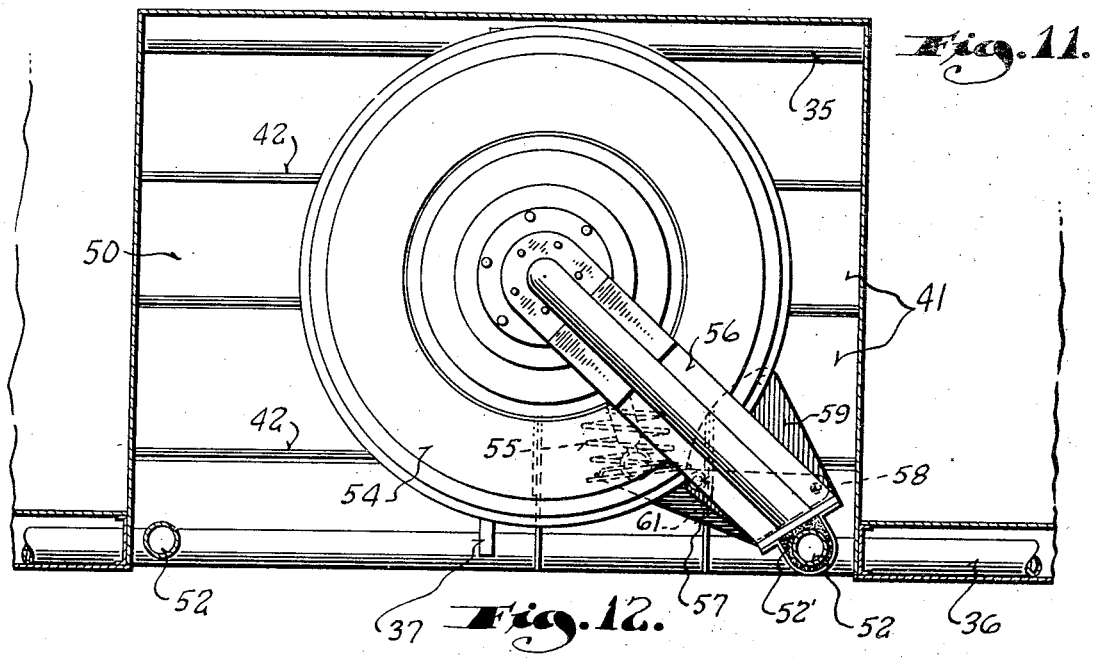
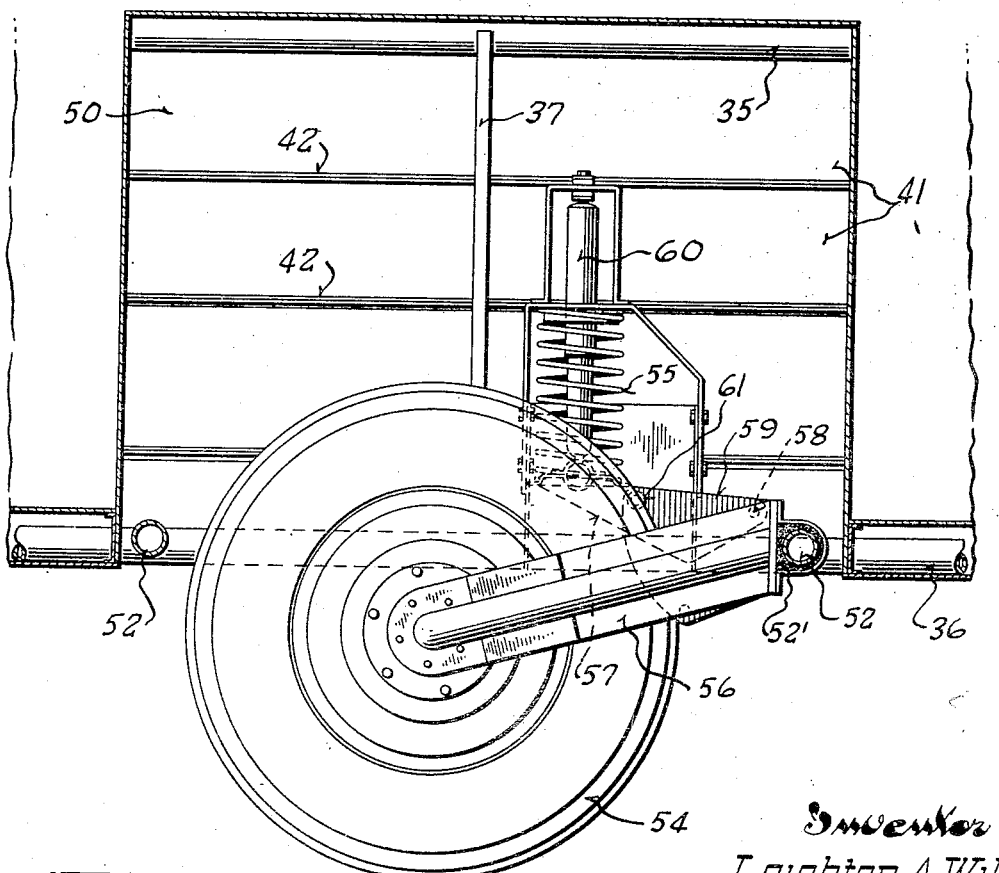
Inventor
Leighton A. Wilkie
By
Attorney Patented Feb. 27, 1945

2,370,508

UNITED STATES PATENT OFFICE 2,370,508

AMPHIBIOUS VEHICLE

Leighton A. Wilkie, Des Plaines, Ill.

Application September 15, 1941, Serial No. 410,801

10 Claims. (Cl. 9—1)

This invention relates to an amphibious vehicle which through the use of novel design combines the features of a fast, readily maneuverable, luxuriously appointed cabin cruiser adapted for quick conversion into a trim, easily handled sailing craft, with the utility and convenience of a well-equipped house trailer.

Combination land and water vehicles have been proposed in the past, but all past devices of this type have been impractical makeshifts. Hence, it is no small wonder that the first reaction to any new proposal of this character brings an impulse to brand the new conception as "wishful thinking." However, despite this handicap, and contrary to its predecessors, this invention provides a practical amphibious vehicle which, through the utilization of new and novel construction technique, assures unquestioned utility as a house trailer and as a boat of the motor-sailer type within the means and management of the average automobile owner.

The conventional cabin cruiser is a heavy craft which is seldom if ever transported from one body of water to another. Its wooden construction and fine appointments call for the skill of master craftsmen and consequently the cost of such boats is high.

Even if the extreme weight of such boats were disregarded and means were provided for making them portable over land, no boat owner would think of pulling his expensive cabin cruiser out of the water and transporting it across land. Such boats cannot be subjected to repeated out-of-water periods without incurring the danger of a leaky hull.

Hence, the objective of combining the features of a motor-sailer type of boat with those of a fully-equipped house trailer cannot be achieved by merely providing wheels for a cabin cruiser. An entirely new type of construction is required, and the sporadic attempts of the past to combine the features of land and water craft are of no avail in the solution of the problem.

To accomplish its purpose, this invention contemplates a new type of hull construction which achieves lightness without sacrifice of strength and which overcomes the objections to pulling a boat out of the water by employing an all-metal construction.

More specifically, it is an object of this invention to provide a hull construction having a strong frame built up of structural members encircling the hull at spaced elevations and rigidly connected by metal ribs welded thereto and upon which inner and outer shells are attached which may be of sheet metal or any other suitable covering material not subject to the limitations of wood.

In the interest of safety and to obviate the need for a heavy keel which requires considerable depth, it is another object of this invention to provide a ballast compartment between the inner and outer shells of the hull which may be filled with either fresh water or sea water to provide water storage or merely a water ballast.

It is also an object of this invention to so construct the ballast compartment that the water therein will not swish from side to side but will remain in its longitudinal half of the boat hull so as to provide a uniformly distributed weight along the chine of the hull to keep the boat righted when it heels over under sail pressure.

Also, in connection with the hull construction, it is an object of this invention to provide a craft of the character described which has a comparatively shallow draft and which by means of a novel bottom construction eliminates the necessity for the customary keel.

It is also an object of this invention to so construct the hull that pockets are formed in the ballast compartment for the reception of retractable trailer wheels.

Again with reference to the hull construction, it is an object of this invention to provide a boat which is always water tight and free from the odors of bilge water or soaked plank, and which as a consequence has much clean and dry storage space which in conventional wooden boats has but limited use.

Another object of this invention with special reference to the hull construction is to provide ribs of novel design and a novel manner of applying the exterior covering to these ribs by which light metal or equivalent material is applied in such a manner that the covering cooperates with the ribs to form an exceptionally rigid though light construction.

This invention also contemplates the provision of a novel cabin design and a novel manner of utilizing the available space within the cabin to afford cabin seats for daytime use and berths for sleeping.

Another object of this invention is to provide an exceedingly simple manner of quickly providing a top covering or canopy for the cockpit area of the boat known as the flying bridge.

It is also an object of this invention to provide a novel manner of storing the top for the flying bridge on the roof of the cabin in such a way that its presence in nowise mars the appearance or lines of the craft.

Still another object of this invention resides in the novel manner of mounting or attaching the anchor so that the anchor and its cable may be used to pull the craft out of the water onto land merely by manipulating the anchor lifting winch.

With the above and other objects in view which will appear as the description proceeds, this invention resides in the novel construction, combination and arrangement of parts substantially as hereinafter described and more particularly defined by the appended claims, it being understood that such changes in the precise embodiment of the hereindisclosed invention may be made as come within the scope of the claims.

The accompanying drawings illustrate one complete example of the physical embodiment of the invention constructed in accordance with the best mode so far devised for the practical application of the principles thereof, and in which:

Figure 1 is a side elevational view of the amphibious craft of this invention showing the same in its condition for use as a cabin cruiser;

Figure 2 is a side elevational view of the craft illustrating the same equipped for sailing;

Figure 3 is a side elevational view of the craft showing the manner in which it is towed as a trailer;

Figure 11 is a view looking into one of the wheel pockets and showing the wheel retracted; and Figure 12 is a view similar to Figure 11 but showing the wheel in its lowered ground engaging position.

Figure 4:
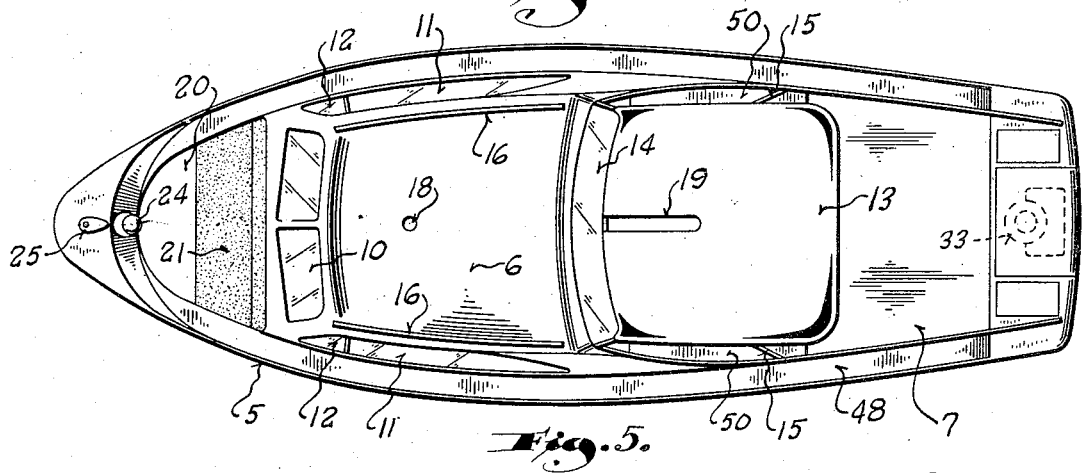
Figure 4 is a top plan view of the craft in its condition for use as a cabin cruiser.
Figure 5:
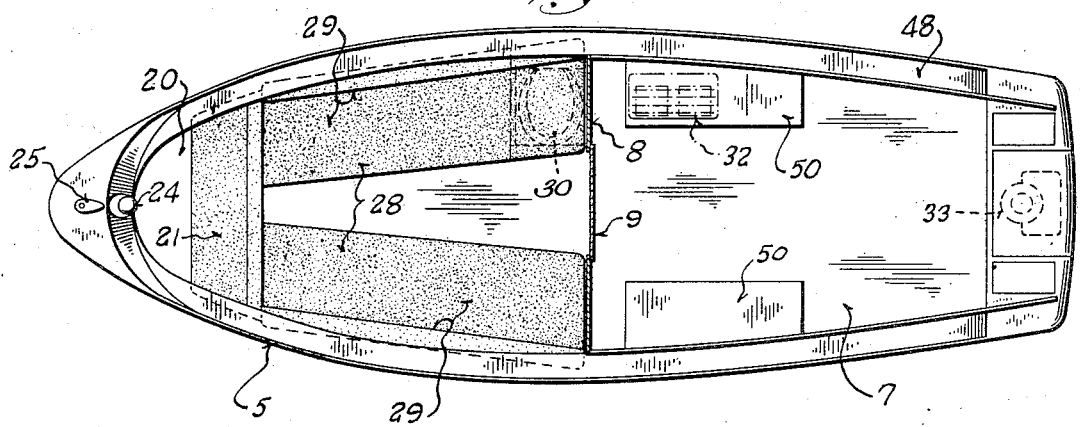
Figure 5 is a horizontal sectional view through the top of the cabin.

Referring now particularly to the accompanying drawings, in which like numerals indicate like parts, it will be seen that the hull 5 has exceptionally trim lines with a flaring clipper bow and a bottom construction which makes the boat exceptionally seaworthy and fast and gives it a shallow draft.

The forepart of the craft provides an enclosed cabin 6, while the aft portion constitutes a cockpit or flying bridge 7. The transverse wall 8 which separates the cabin from the cockpit or flying bridge is provided with a door 9.

The front of the cabin has a windshield 10 and its sides have panels 11 of glass mounted therein with movable ventilating sections 12 much in the fashion of an automobile.

The cockpit or flying bridge is equipped with a removable top 13 which when in position as shown in Figure 1 has its forward end supported on a windshield 14 and its rear portion supported by braces 15 or the like. When not in use, this top snugly fits the roof of the cabin where it is held in place by being received between guideways or ridges 16 projecting up from the cabin roof and the windshield 14 folds down to a horizontal position forming a canopy extending aft from the cabin roof as shown in Figures 2 and 3.

Figure 8:
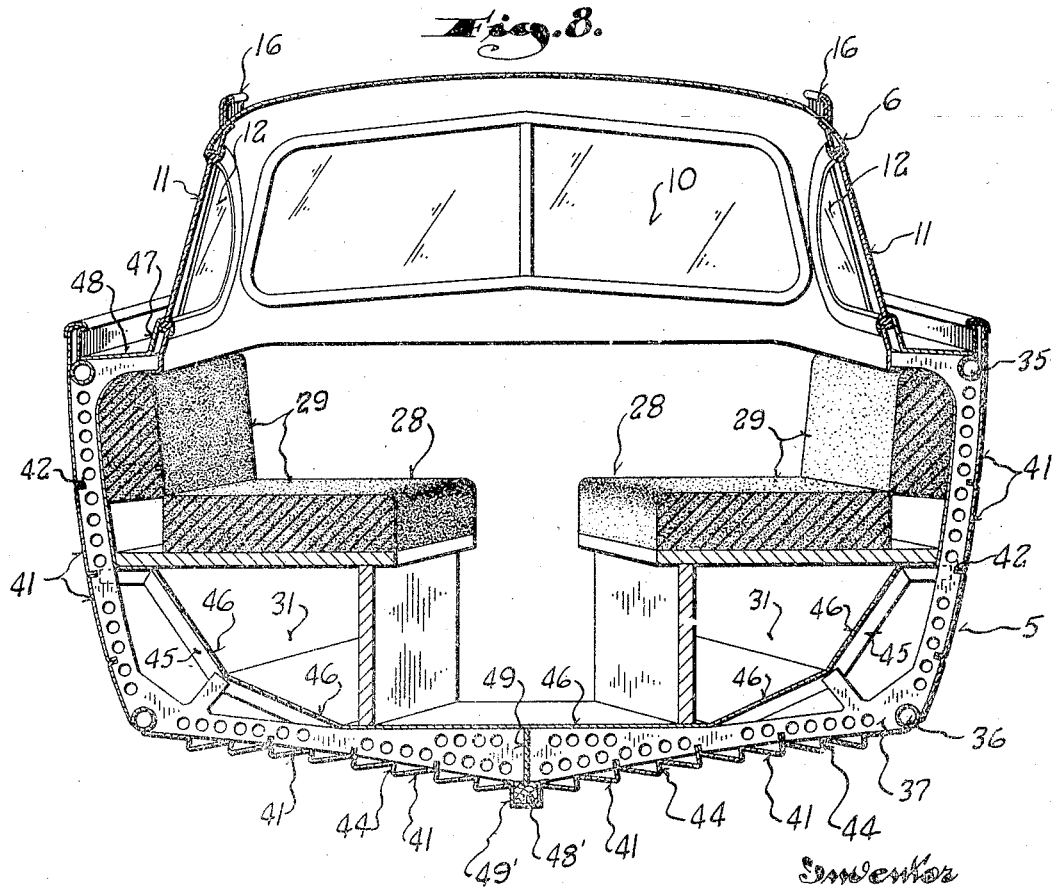
Figure 8 is a cross sectional view through the craft taken substantially on the plane of the line 8—8 in Figure 1.

Attention is directed to the fact that the guideways or ridges 16 also provide hand rails extending along the edge of the cabin roof as clearly shown in Figure 8.

When it is desired to convert the craft into a sailing vessel, a mast 17 which, when not in use may be carried along the gunwhale, is passed through a hole 18 in the cabin roof and stepped into a socket (not shown) in the floor of the cabin. To accommodate the mast, the canopy-like top 13 of the flying bridge has a slot 19 opening to its front edge so that the top 13 may be applied or removed from the cabin roof while the mast is in position.

In the prow of the boat ahead of the cabin windshield 10 is a compartment 20 provided with a seat 21. This compartment may be open as shown or it may be covered by a deck equipped with a hatch (not shown) hingedly or otherwise mounted to permit access to the compartment.

In front of this compartment, in the extreme bow of the boat and opening to the compartment is a hawse pipe 22 to receive the anchor 23. The cable for the anchor is wound on a winch 24 mounted directly in front of the compartment 20 where it may be conveniently manipulated by a person standing in or seated in the compartment 20.

Forwardly of the winch 24 is a ship's light 25 and mounted in the prow is a generator 26 to be driven by wind power by a fan 27 detachably secured to the shaft of the generator.

The cabin interior is provided with a pair of seats 28 extending along the sides thereof. The back and seat cushions 29 of these seats are so designed that they may be laid flat in edge to edge relationship to form two berths or bunks for sleeping purposes. One of the seats 28 may have a toilet 30 built into it and normally covered by a movable section of the seat cushion.

The space 31 under the seats provides storage compartments, which by virtue of the construction employed, are thoroughly dry at all times.

The cockpit or flying bridge portion of the hull provides space for a galley stove 32 which may be arranged to fold into a covered compartment when not in use.

The power plant for the boat consists of an outboard motor 33 conveniently set into a recess 34 in the stern of the boat so as not to take up valuable space.

The hull consists of a light but strong metal frame work formed of two superimposed frame members 35 and 36 both preferably formed of seamless tubing bent to substantially elliptical shape so as to extend entirely about the hull. The former of these frame members is uppermost and extends along the rail of the hull while the latter is at the chine. These tubular frame members are rigidly connected by a plurality of transverse ribs 37.

Figure 10:
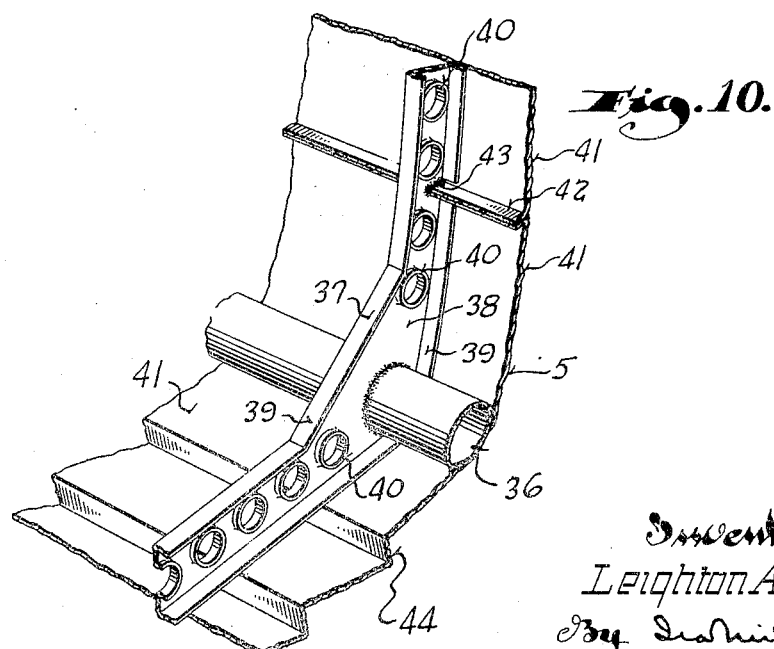
Figure 10 is a perspective fragmentary view illustrating a detail of the hull construction.

The ribs are made of metal and are welded to the frame members, and while seamless tubing may be employed for the ribs they are conveniently stamped from sheet metal as best shown in Figure 10. As here shown, the frame members are shaped to the hull cross section at their respective locations, and define the inside shape of the hull which is devoid of transverse curvatures wherever possible.

The ribs are blanked and stamped from sheet metal and have flat webs 38 with marginal flanges 39 extending perpendicularly therefrom to give the ribs a channel-shaped cross section. For lightness, the webs 38 are punched out and the holes formed thereby have marginal flanges 40 which help provide rigidity for the ribs.

The ribs are cut out to accommodate the tubular frame members and are welded thereto as stated. Thus the frame members in conjunction with the ribs welded thereto and which extend uninterruptedly across the full width of the hull at their respective locations, form a rigid structure which entirely obviates the need for the conventional heavy keel.

The outer covering of the hull consists of sheet metal strips 41 extending longitudinally along the sides of the hull. The longitudinal marginal edges of these strips are flanged inwardly as at 42 so that the flanges 42 of two adjacent strips engage face to face. The contacting marginal flanges are received in notches 43 in the metal ribs and are welded to the ribs and also to each other. In this manner the flanges 42 serve as longitudinal ribs which coact with the transverse ribs to produce an exceptionally strong but light hull construction.

Attention is directed to the fact that the tubular marginal frame member 36 is exposed to form the actual chine of the boat and that the adjacent covering strips are welded thereto as clearly shown in Figure 8. This provides an exceptionally strong construction at the point where strength is especially needed.

The strips 41 which cover the bottom of the hull are bent longitudinally to form steps 44 facing outwardly so as to give the bottom of the boat a multiple keel effect. While the bottom forming strips 41 may be as wide as desired, their width is preferably equal to two of the saw tooth shaped steps 44.

Along the chine of the boat, the ribs have inner sections 45 attached thereto which substantially form chords across the chine. These inner rib sections as well as the rib portions above and between them have inner shell forming panels 46 of sheet metal welded thereto. Thus the hull is given a hollow walled construction which not only greatly increases its strength but also provides water ballast compartments.

At the top, these compartments may be left open or the inner shell may extend around to the combing 47 which rises up from the deck 48 and extends along the cabin and the cockpit or flying bridge. The deck 48 like the outer hull covering is welded to the upper frame member 35.

To preclude water contained in the ballast compartment from swishing from side to side a partition wall 49 extends longitudinally along the keel line of the boat across the full height of the ballast compartment so that water in one longitudinal half of the ballast compartment cannot flow into the other half of the compartment.

Thus, when the boat heels over under sail pressure, the weight of the water along the raised chine provides a counterbalance and obviates the necessity for the crew holding down the rail.

Obviously the ballast compartments may be equipped with valves (not shown) controllable from inside the boat for letting in the sea water or they may be used for fresh water storage, but by virtue of the metal construction no part of the boat interior is wet and bilge odors are entirely avoided.

Attention is directed to the novel manner in which the partition wall 49 is formed and assembled with the bottom. Inasmuch as the ribs extend uninterruptedly across the width of the hull the partition 49 is made up of pieces arranged end to end and spanning the distance between ribs to which they are welded. The upper edges of the partition forming pieces are welded to the inner shell 46 and their lower edges extend down beneath the ribs to be received in a grooved wooden strip 48' which extends along the keel line. This strip is covered by a metal sheath 49' U-shaped in cross section and provided with marginal flanges tucked under the edges of the adjacent bottom forming strips 41 to which they are welded.

A water-tight connection between the partition wall and the bottom of the hull is thus obtained in an exceedingly simple and practical manner while at the same time a light but adequately strong keel is provided.

In the aft portion of the boat wheel pockets 50 are provided. These pockets are actually in the ballast compartments being formed by parts 51 of the inner shell 46. In front and back of these pockets the structural frame shown in Figure 6 has two tubular transverse members 52 connecting the opposite stretches of the marginal chine forming member 36 and these transverse members are joined by braces 53 to which the adjacent rib 38' is welded.

Figure 9:
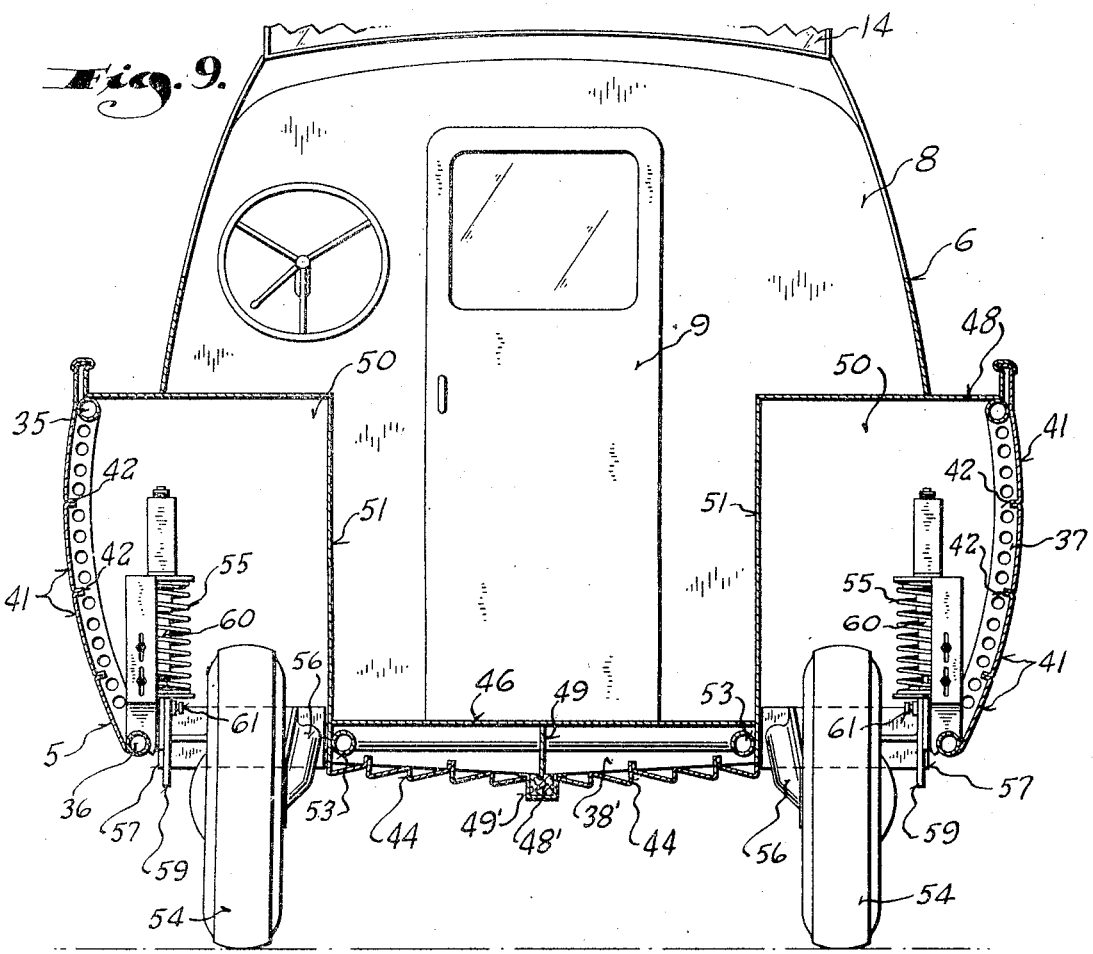
Figure 9 is a cross sectional view taken through Figure 3 substantially on the plane of the line 9—9.

At the bottom, the wheel pockets are open to permit the wheels 54 to be moved from retracted positions wholly within the pockets to lowered ground engaging positions shown in Figures 9 and 12.

The specific wheel mounting as illustrated in Figures 11 and 12 incorporates a spring 55 designed to take road shock and give the craft smooth riding qualities comparable to those of a passenger car. Each wheel is journalled on a stub axle carried by an arm 56 hingedly mounted on one of the cross members 52 to swing in an arc at the wheel to and from retracted position.

The attachment of the arm to the cross member preferably incorporates a rubber cushion 52'.

Similarly mounted is a segment-like bracket 57; and pivoted to the bracket as at 58 is an inner arm 59 the outer end of which bears against the spring 55 and is supported against descent beyond a limited extent by a telescoping shock absorber 60. The relative positions of the bracket and the inner arm determine the position of the wheel. Hence, a removable pin 61 or its equivalent is used to secure the bracket and inner arm together.

If the wheel is lowered, its retraction requires merely withdrawal of the pin 61 from the aperture in the bracket 57 in which it is engaged, lifting of the wheel into the pocket, and engagement of the pin in another aperture in the segment-like bracket 57 as shown in Figure 11.

Figure 6:
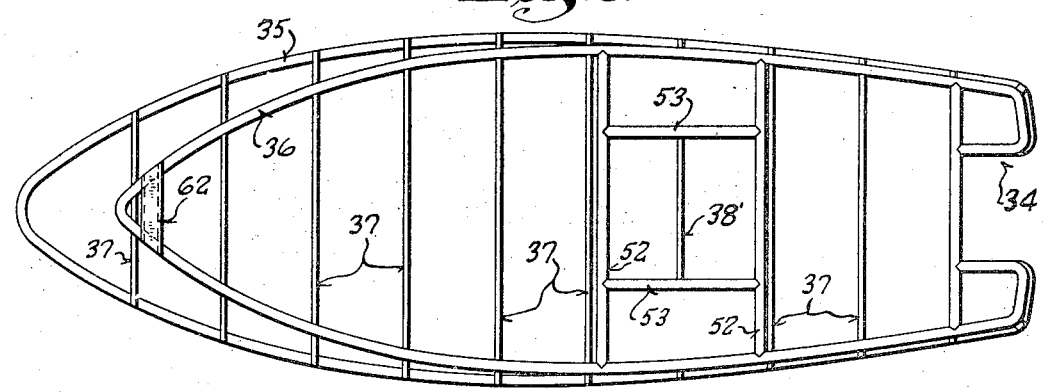
Figure 6 is a bottom view of the structural frame which forms the backbone of the hull.
Figure 7:
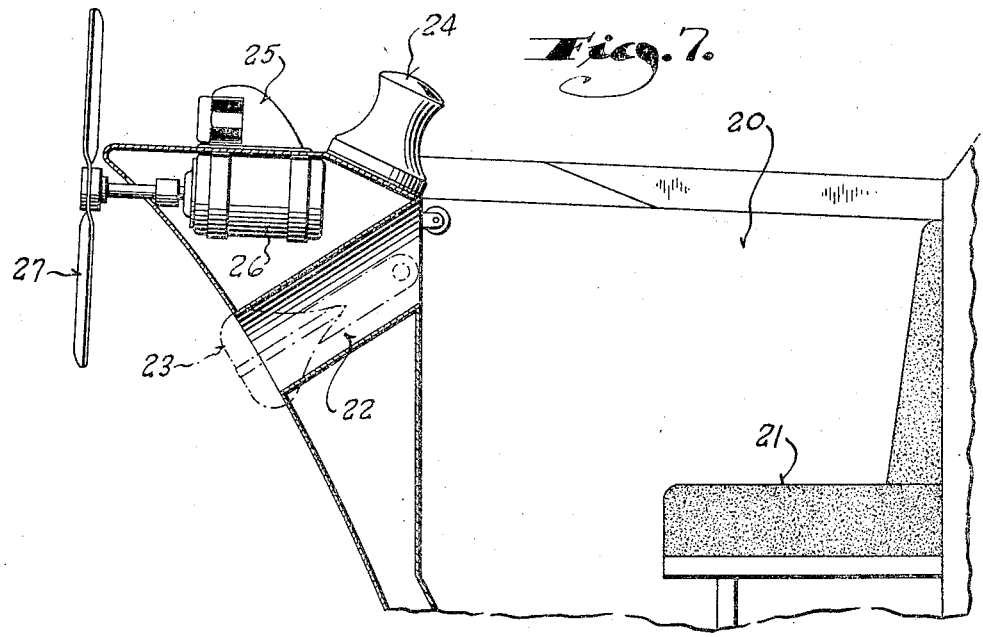
Figure 7 is a vertical sectional view through the body of the boat illustrating the anchor mounting and the manner in which a wind powered generator is mounted in the prow of the boat.

Inasmuch as the structural frame specifically shown in Figure 6 constitutes the backbone of the hull, the trailer hitch is attached thereto. For this purpose the frame forming member 36 has a tubular member 62 welded thereto. In this manner a slot directly through the lower portion of the prow of the boat is provided for the reception of the supporting fitting of a trailer hitch 63 indicated in dotted lines in Figure 3.

If desired, a small wheel (not shown) may be attached to the prow of the boat in a similar manner to facilitate pulling the boat out of the water.

By virtue of its novel mounting, the anchor may be utilized to pull the boat out of the water and onto the shore. To do so, the cable supporting the anchor is paid out and the anchor carried to shore and hooked onto a support such as a tree or the like. Then by working the winch 24 the boat virtually pulls itself out of the water.

From the foregoing description taken in connection with the accompanying drawings, it will be readily apparent to those skilled in the art that this invention provides an amphibious vehicle or craft which combines for the first time the advantageous features of a cabin cruiser, a sailboat, and a house trailer, in a practical manner and at a price within the range of the average automobile owner.

What I claim as my invention is:

1. A combination boat and trailer comprising: a hollow walled hull composed of inner and outer shells connected in spaced relation to form a light, strong structure with the space between the shells providing a ballast compartment; pockets separated from said compartment formed between the inner and outer shells at the opposite sides of the hull, said pockets opening to the bottom of the hull and having a vertical depth substantially equal to the height of the sides of the hull; and wheels mounted for retraction into said pockets.

2. A combination boat and trailer comprising: a hull having a light, sturdy frame; a covering over said frame forming the outside of the hull; an inner shell cooperating with said covering to form a hollow wall space substantially lining the hull to provide a ballast compartment, the space between said outer covering and the inner shell being great enough at opposite side portions of the hull as to provide laterally spaced wheel pockets closed off from the ballast compartment and opening through the bottom of the hull; and wheels mounted on said frame for movement from a ground engaging position projecting down out of said pockets and in which the wheels support the boat for travel on land as a trailer to a retracted position wholly within the pockets.

3. A combination boat and trailer comprising: a hull frame composed of superimposed light structural metal marginal members bent to substantially elliptical shape to extend around the hull on spaced substantially horizontal planes, and transverse metal ribs connecting said marginal members; sheet metal siding attached to said frame to provide the outer sides and bottom of the boat; an inner shell attached to said transverse ribs and cooperating with the outer siding to form a hollow wall providing a ballast compartment, said compartment having pockets opening through the bottom of the hull and extending upwardly substantially to the upper of said superimposed marginal members; closures for the pockets attached to said upper marginal member; trailer wheels; and means mounting said wheels from the frame for movement from a retracted position wholly within the pockets to a lowered ground engaging boat supporting position.

4. A combination boat and trailer comprising: a hull frame formed by a light metal marginal member extending completely around the chine of the hull and transverse metal ribs welded to said marginal member and connecting the opposite stretches thereof; sheet metal siding applied to said ribs to provide an outside hull covering; sheet metal siding applied to the ribs inside the outer hull covering; said inner and outer coverings cooperating to form hollow walls for the hull, the inner wall having upright portions thereof offset inwardly away from the outer sides ing to provide wheel pockets opening to the bottom of the hull and of a depth substantially equal to the height of the sides of the boat; closures for the tops of said pockets; wheels; means mounting said wheels on the frame for movement from a retracted position wholly within the pockets to a lowered ground engaging position in which the wheels support the boat for travel on land as a trailer; and a trailer hitch anchor welded to said marginal member at the prow of the hull.

5. A combination boat and trailer comprising: an all metal frame consisting of superimposed marginal members of generally elliptical formation, one of which provides the chine for the boat hull and the other of which defines the rim or rail of the hull; transverse ribs welded to and connecting said marginal members; sheet metal siding applied to the marginal members and ribs to form an outer covering and a substantially flat bottom for the hull, said siding at the bottom of the hull being omitted at two opposite areas adjacent to the chine forming marginal member to define the openings to wheel pockets; sheet metal siding applied to the inner edges of the transverse ribs and cooperating with said outer hull covering to form hollow hull walls providing a ballast compartment, said inner sheet metal siding being so shaped with respect to the outer hull covering as to form enlarged ballast compartments directly above the marginal edges of the substantially flat bottom, and said compartments being closed adjacent to said openings in the outer hull covering and formed to provide wheel pockets extending from the bottom of the boat substantially to the rim or rail of the hull; wheels; and means mounting said wheels from the frame for movement from retracted positions wholly within the pockets to lowered ground engaging boat supporting positions projecting out beneath said pockets.

6. A hull construction comprising: superimposed light structural metal marginal frame members bent to substantially elliptical shape to extend entirely around the hull; light metal transverse ribs welded to and rigidly joining said frame members, the lower one of said frame members providing the chine of the hull and the upper frame member providing the rim or rail of the hull; light inner and outer shells applied to said frame members and ribs in spaced apart relation to form a hollow walled hull having nearly vertical sides and a relatively flat bottom defining a substantially sharp right angle with the sides of the hull along the major portion of the length of the chine, the space between said shells forming a ballast compartment and said inner shell extending substantially diagonally across the relatively sharp angle of the outer shell at the chine to enlarge the ballast compartment at said chine; and means dividing said ballast compartment longitudinally substantially along the keel line of the hull so as to preclude water in the compartment from swishing from side to side.

7. In a boat: a hollow hull composed of inner and outer shells, the bottom of the inner shell providing a floor for the boat interior and the bottom of the outer shell providing the bottom for the boat, the space between the shells serving as a water ballast compartment, and the inner shell extending substantially diagonally across the junctions between the outer sides and bottom of the hull to enlarge said ballast compartment along the chine of the hull; a partition extending along the keel line of the boat dividing said water ballast compartment into separated chambers, said partition being welded to the floor forming portion of the inner hull shell; and a keel forming strip having the partition extending into a groove therein.

8. In a boat: a hollow hull composed of spaced apart inner and outer shells providing a hollow bottom and sides for the hull, the bottom of the inner shell providing a floor for the boat interior and the bottom of the outer shell providing the bottom for the boat, the space between the shells serving as a water ballast compartment, and the inner shell extending substantially diagonally across the junctions between the outer sides and bottom of the hull to enlarge said ballast compartment along the chine of the hull; a partition extending along the keel line of the boat dividing said water ballast compartment into separated chambers, said partition being welded to the floor forming portion of the inner hull shell; a keel forming strip having the partition extending into a groove therein; and a metal sheath for the keel forming strip covering the same and holding the same in place, said sheath being welded to the adjacent bottom forming portions of the outer shell.

9. In a boat, a hull construction comprising: a rigid structural frame including transverse metal ribs extending uninterruptedly across the width of the boat and having notches in their lower edges; a plurality of strips of sheet metal, each bent sharply longitudinally to form at least one saw tooth-like step defining an abrupt flat shoulder substantially at right angles with the strip; attaching flanges on the marginal edges of each strip angularly disposed with respect to the strip, said marginal flanges on adjacent strips abutting and being received in the notches of the ribs; and weld securing said abutting flanges to the ribs with the abrupt longitudinally extending shoulders of the strips facing outwardly from the keel line of the boat toward the sides of the hull.

10. A hull construction for boats and the like, comprising: superimposed light metal longitudinal frame members bent to substantially elliptical shape to define the gunwale and the chine of the hull, said longitudinal frame members being substantially one above the other for a considerable portion of their lengths; transverse metal ribs welded to the longitudinal frame members, said ribs being U-shaped and having their upstanding legs joining the longitudinal frames and their bottoms extending across the lower chine forming frame, said bottoms of the U-shaped ribs being very nearly flat and for the most part forming substantially right angles with their upstanding legs with the chine at the apex of the angle; a sheet metal covering fixed to the outside of the ribs and longitudinal frame members to form an outer shell for the hull; means on the insides of the U-shaped ribs for supporting an inner shell, said means extending substantially diagonally across the relatively sharp angle of the outer shell at the chine; a sheet metal covering fixed to said supporting means of the transverse ribs to provide an inner shell for the hull, the space between the shells providing ballast compartments which are large at the chine in proportion to the rest of the hull; and a partition connecting the inner and outer shells between the opposite chines to separate the ballast compartment at one chine from the ballast compartment at the other chine.

LEIGHTON A. WILKIE.